July 15, 1947.                J. A. CALDWELL ET AL                2,424,146
           CALIBRATION MECHANISM FOR SELF-BALANCING POTENTIOMETERS
                       Filed March 25, 1943            2 Sheets-Sheet 1

INVENTOR.
JOHN A. CALDWELL
GEORGE W. BARNES JR
BY
ATTORNEY.

July 15, 1947.                    J. A. CALDWELL ET AL                    2,424,146
                   CALIBRATION MECHANISM FOR SELF-BALANCING POTENTIOMETERS
                            Filed March 25, 1943            2 Sheets—Sheet 2
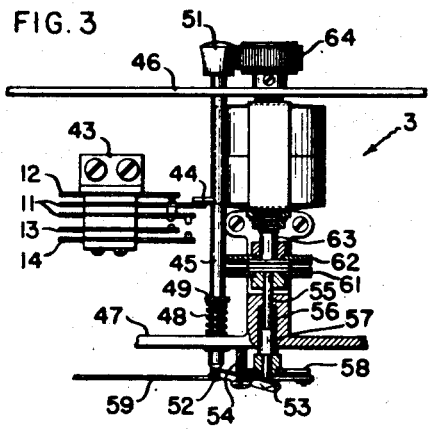
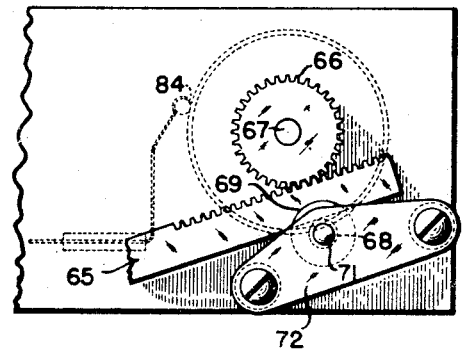
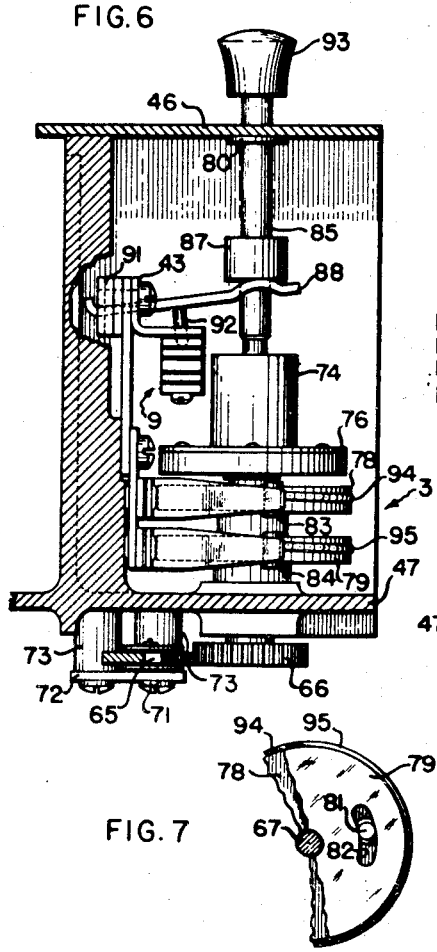
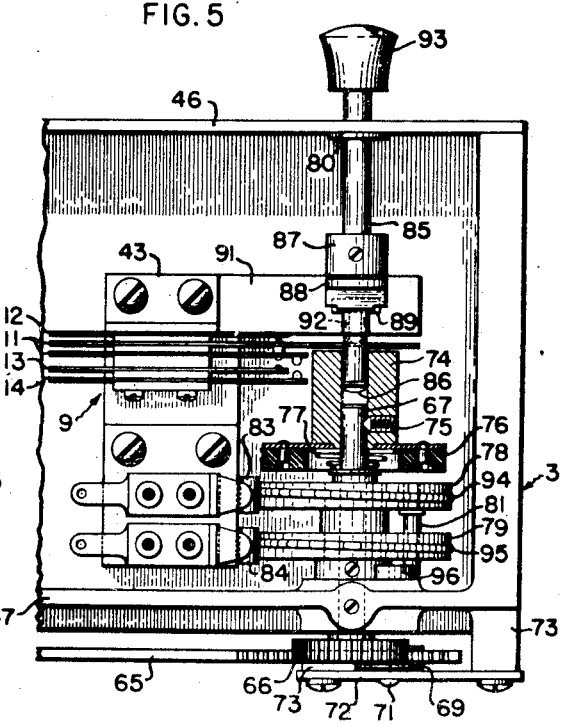
INVENTOR.
JOHN A. CALDWELL
GEORGE W. BARNES JR.
BY
*CB Spangenberg*
ATTORNEY.

Patented July 15, 1947

2,424,146

UNITED STATES PATENT OFFICE 2,424,146

CALIBRATION MECHANISM FOR SELF-BALANCING POTENTIOMETERS

John A. Caldwell, Philadelphia, and George W. Barnes, Jr., Clifton Heights, Pa., assignors to The Brown Instrument Company, Philadelphia, Pa., a corporation of Pennsylvania Application March 25, 1943, Serial No. 480,580

6 Claims. (Cl. 175—183)

1

The present invention relates to measuring instruments, and particularly to measuring instruments of the self-balancing potentiometer type and to means for recalibrating or standardizing them.

As is well known, the voltage supply for most potentiometer instruments is derived from a dry cell. While such a source is substantially constant, there is, over a period of time, a decrease in the voltage produced. Such a decrease will not prevent the instrument from balancing itself, but will cause the balance point to be inaccurate. Periodically, therefore, a resistance in series with the dry cell is adjusted to bring the potential drop across the slide wire to some standard value in order to maintain the accuracy of the instrument.

It is an object of this invention to provide a simplified means for adjusting the standardizing resistance of a potentiometer circuit. It is a further object of the invention to have the standardizing resistance of a potentiometer circuit adjusted by means of the pen moving mechanism, which is operated whenever an unbalanced condition of the potentiometer circuit occurs. It is a further object of the invention to provide potentiometer standardizing means which, when started by an operator, will serve to standardize automatically a potentiometer circuit, which means is driven by the potentiometer mechanism.

The various features of novelty which characterize our invention are pointed out with particularity in the claims annexed to and forming a part of this specification. For a better understanding of the invention, however, its advantages and specific objects obtained with its use, reference should be had to the accompanying drawings and descriptive matter in which we have illustrated and described a preferred embodiment of the invention.

In the drawings:

Figure 3 is a top view, partly in section, of the standardizing mechanism of Figure 1, Figure 4 is a front view of another type of standardizing mechanism, Figure 5 is a plan view of Figure 4, Figure 6 is a view taken from the left of Figure 5, and Figure 7 is a detail view showing the connection between the two standardizing resistances.

Figure 1:
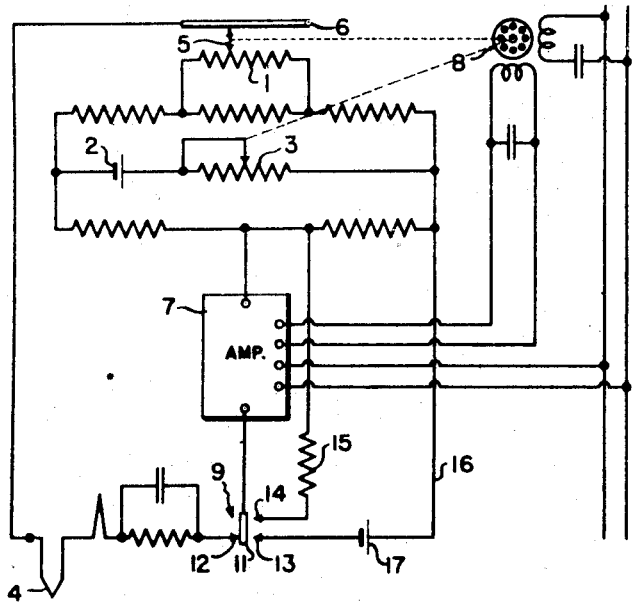
Figure 1 is a wiring diagram showing a conventional potentiometer circuit.

In Figure 1 there is shown a typical potentiometer circuit in which there is a slide-wire 1

2 that has a potential impressed across it by a battery 2 to produce a predetermined voltage drop; the battery preferably being in the form of a dry cell. Connected in circuit with the battery is a variable resistance 3 that is used to maintain constant the potential drop in the circuit as the battery diminishes in power in order to maintain the system in calibration. The voltage from a thermocouple 4 is impressed across a portion of the slide-wire 1 as determined by the position of a contact 5 between the slide-wire and a parallel collector bar 6. As the thermocouple temperature changes, the potentiometer circuit becomes unbalanced and this in turn is detected by a vibrator and amplifier unit 7 to energize a motor 8 to shift the contact 5 along the slidewire in the proper direction and amount in order to rebalance the potentiometer circuit. The details of the vibrator and amplifier are disclosed in the co-pending application of Walter P. Willis, Serial No. 421,173, and which was filed on December 1, 1941.

The thermocouple is normally connected in the circuit by means of a switch 9 which consists of a movable contact 11 that is directly connected to the amplifier and a stationary contact 12 that is connected to the thermocouple. This switch is also provided with stationary contact 13 that is connected to the potentiometer network, and stationary contact 14, that is used to insert a shunt resistance 15 around the amplifier at such times as the potentiometer circuit is being standardized. In the wire 16 between the contact 13 and the potentiometer network there is located a standard cell 17 which is used to impress a standard potential drop across a portion of the potentiometer network at such times as the network is being recalibrated or standardized.

In the operation of a potentiometer network of the type disclosed above, upon the occurrence of a change in temperature of a thermocouple 4 the potentiometer circuit will be unbalanced to produce a current flow in one direction or the other through the vibrator which is included along with the amplifier and designated as 7. The vibrator and amplifier will detect this unbalance, its direction and amount, and correspondingly energize the motor 8 for rotation in the proper direction. This motor is mechanically connected in a manner to be described with the contact 5 so that the latter is shifted along the slide-wire 1 and collector 6 to a position in which the potentiometer circuit is again rebalanced and no current flows through the unit 7.

Due to the fact that the strength of the battery 2 gradually diminishes with use it becomes necessary to adjust the resistance 3 from time to time in order to maintain the calibration of the instrument. At such times as the instrument is to be recalibrated or standardized, the movable contact 11 of the switch 9 is shifted to the right to disconnect the thermocouple from the circuit and to insert the standard cell 17 across a portion thereof and to simultaneously insert the shunt 15 around the unit 7. If the circuit needs recalibration a current flow will be produced through the unit 7 in a manner similar to that produced by the thermocouple 4, producing an energization of the motor 8 to rotate this motor in a direction and an amount proportional to the potentiometer unbalance at that time. This rotation of the motor is used to adjust the amount of the resistance 3 which is inserted in the circuit. The details whereby this varying of the amount of the resistance in the circuit may be accomplished and these details in combination with the potentiometer instrument form the subject matter of this invention.

Figure 2:
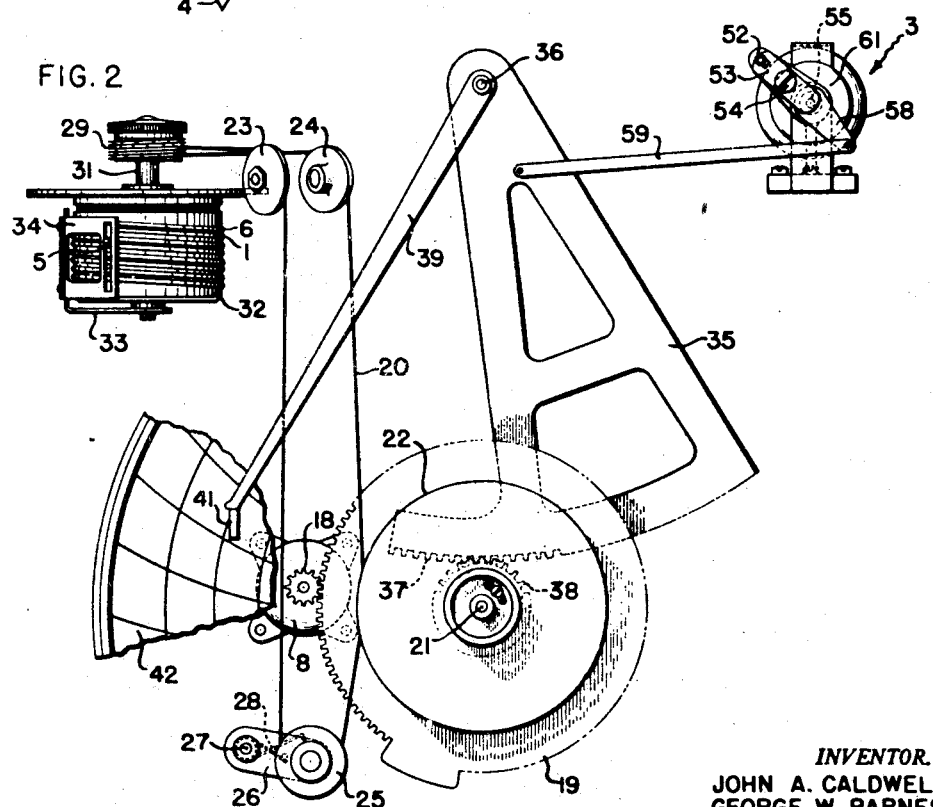
Figure 2 shows the moving parts of the potentiometer.

Referring now to Figure 2 it will be seen that motor 8 is provided with a pinion 18 that meshes with a gear 19 which is attached to a shaft 21. As the motor rotates, the gear and shaft will also be rotated to turn a driving pulley 22 which is attached to the shaft 21. A portion of a cable 20 is wrapped around this driving pulley and passes over additional pulleys 23, 24, and 25, the latter of which is mounted on a lever 26 that is pivoted at 27 and biased in a clockwise direction by a spring 28 in order to take up any slack that may appear in the cable. The ends of the cable are wrapped around and attached to a driven pulley 29 that is mounted on a shaft 31 which is journaled for rotation in a ceramic or other insulating support 32. This support has wrapped around it in parallel helical relation the slidewire 1 and the collector 6.

A support for the contact 5 is mounted on the lower end of the shaft 31 and consists of an angle member 33 which extends beyond the edge of the support 32 and upwardly parallel to the side of the same. This member has attached to it a spring 34 that is provided with a slot in which the contact 5 is located. Therefore, it will be seen that as the motor 8 rotates it serves, through the cable 20, to drive pulley 29 and support 33, 34 to move the contact 5 around the outer edge of the support 33. The contact is held by the part 34 in engagement with the slide-wire and collector so that as it rotates more or less of the slidewire is inserted in the thermocouple circuit to rebalance the potentiometer as the thermocouple changes in temperature.

The motor 8 also serves to drive a pen which will make a record of the value of the temperature of the thermocouple as the motor rotates. To this end there is provided a sector member 35 that is attached to a shaft 36. This sector member has gear teeth 37 formed on its lower surface which teeth mesh with a pinion 38 that is also attached to the shaft 21 and which pinion serves to drive the sector as the former is rotated. Pen arm 39, which carries on its lower end a pen 41, is attached to the shaft 36 to move with the sector as the latter is driven by the motor 8. The pen 41 is adapted to make a record on a chart 42 of the value of the temperature.

At such times as the arm 11 of switch 9 is moved to the right in Figure 1, the sector 35 will also operate to standardize the potentiometer network. The details of the manner in which this may be accomplished will now be described.

As shown in Figure 3, the switch 9 consists of a series of spring leaves that are insulated from each other, and which are mounted on a support 43 that is attached in a suitable manner to the framework of the instrument. The arm 11 is formed of two members, the longer of which is engaged by a finger 44 that projects from a rod 45 which is journaled in portions 46 and 47 of the instrument framework. This rod is biased upwardly in Figure 3 by means of a spring 48 that encircles the rod and has one end bearing against the part 47 and the other end bearing against a collar 49 which is attached to the rod. Rod 45 is provided at its upper end with a knob 51 and is formed on its lower end with a reduced portion 52 that egages a slot in a rocking lever 53. When the rod 45 is moved downwardly in Figure 3, its end 52 moves the lever 53 around a pivot screw 54 into engagement with the end of a shaft 55. This latter shaft is biased in a downwardly direction by means of a spring 56 that engages at one end with an enlarged portion or collar 57, and at the other end with a socket that is formed in the frame member 47. One end of the shaft 55 carries an arm 58 that is connected with the sector 35 by means of a link 59 which extends between the two. The other end of the shaft 55 carries a clutch plate 61 that is adapted to cooperate with a second clutch plate 62 on a shaft 63 that projects from the casing in which the standardizing resistance 3 is enclosed. As shown herein, the standardizing resistance 3 is a conventional type of vernier resistance. By this it is meant that the unit comprises a coarse and a fine resistance the former of which may be manually adjusted by a knob 64 which projects from the front thereof through the frame member 46. After the coarse resistance is adjusted manually, the instrument serves through the shaft 55 and the clutch 61 and 62 to give a vernier adjustment by means of a fine resistance element to correctly standardize the instrument.

In the operation of this system when it is desired to standardize the potentiometer circuit, an operator will push the button 51 to move rod 45 downwardly in Figure 3. This simultaneously moves the switch arm 11 from a position in which the thermocouple is connected in the potentiometer circuit to a position in which the standard cell 17 and the resistance 15 are connected in the circuit, and also moves the shaft 55 upwardly to bring the clutch plates 61 and 62 into engagement with each other. If the battery 2 has diminished in power to such an extent that an adjustment in the circuit is necessary, the potentiometer circuit will be unbalanced, and the motor 8 will be run in a direction to rebalance the circuit. Simultaneously, with the movement of the segment 35, arm 58 will be moved by means of link 59 that is connected to the segment. This movement of arm 58 will rotate shafts 55 and 63 to adjust the vernier unit of the resistance 3 an amount sufficient to recalibrate the circuit. At such time as the vernier adjustment is used up, the knob 64 will be rotated manually an amount that will again make the vernier effective.

Another form which the invention may take is shown in Figures 4 to 7. In this form of the invention, the sector 35 is connected with the resistance 3 by means of a link 65 that has a rack formed on the upper portion of its outer end. This rack meshes with a pinion 66 that is attached to the outer or lower end of a shaft 67. The rack on the link 65 is held in mesh with the pinion by means of a roller 68 that is provided with flanges 69 which form a channel to receive the outer end of the link. This roller is mounted on a stud 71 that extends from a plate 72 which is supported by means of screws extending into bosses 73 that project from the frame member 47.

The inner end or the upper end in Figure 5 of the shaft 67 has attached to it a cylindrical member 74. The attachment is accomplished by means of engagement between the set screw 75 which extends through the cylindrical member and engages a flat on shaft 67. This cylindrical member supports one element of the clutch that adjusts the resistance 3, which element is shown herein as being in the shape of a clutch disc 76. The shaft, sleeve and clutch disc are biased upwardly in Figure 5 by means of a spiral spring 77. The spring takes the shape in which it is shown so that it will not require much room when the shaft 67 is moved downwardly to bring the clutch disc 76 into engagement with the upper face of a member 78 that acts as a second clutch disc and also supports the vernier resistance unit of the standardizing resistance 3. In this case, the resistance 3 is formed of a vernier unit that is mounted on the disc 78 and a coarse unit which is mounted on a disc 79, both of which discs are rotatable on the shaft 67. While in the embodiment of the invention above described, the coarse unit was rotated by hand, in this embodiment the coarse unit is driven by the vernier unit through a lost motion connection comprising a pin 81 extending from the disc 78 through an arcuate slot 82 formed in the disc 79. The discs 78 and 79 each has a resistance unit 94 or 95 wrapped around its surface with the resistances engaged respectively by contacts 83 and 84 that are suitably mounted on the framework of the instrument. Engagement between the contacts 83 and 84 and the resistances 94 and 95 not only forms an electrical connection for the potentiometer circuit, but the friction between these members prevents accidental rotation of the resistance units.

The clutch discs 76 and 78 are brought into engagement with each other by means of a rod 85, the lower end of which is rounded as shown at 86, and is received in the central bore of the sleeve 74. The rod 85 is held in its upper position in Figure 5 by means of the spring force of long leaf 11 of the switch 9. This is accomplished by means of engagement between a collar 87 that is formed on the rod 85 and a bowed portion in a switch operating lever 88 that encircles this shaft as shown in Figure 6. The lower end of the lever 88 extends through an opening 89 that is formed in a supporting member 91 and is provided with a projection 92 which engages the leaf of the spring. Upward movement of the rod 85 is limited by engagement between a collar 80 on this rod and the frame member 46.

When it is desired to standardize or calibrate the potentiometer circuit using a construction of this type, a knob 93 that is placed on the upper end of rod 85 is manually forced downwardly by an operator. This brings the end 86 of the rod into engagement with the upper end of shaft 67 to move that shaft and the parts carried thereby downwardly until clutch disc 76 engages the face of disc 78. While this is taking place, the pinion 66 is sliding across the teeth formed on the link 65. For this purpose the pinion 66 is made wider than the rack teeth that are formed on the end of link 65. This same movement of the rod 85 which brings the clutch discs together, also moves leaf 11 on the switch 9 to a position in which 11 is moved out of engagement with contact 12 and into engagement with contacts 13 and 14 to disconnect the thermocouple from the potentiometer circuit and connect the standard cell and resistance therein. If the instrument needs recalibration or standardizing at this time, the potentiometer circuit will be unbalanced to energize motor 8 for rotation in the proper direction. As the motor rotates the sector 35 will be moved and will act through link 65 and the clutch to rotate disc 78 sufficiently to recalibrate the circuit. After the vernier adjustment has been used up or when pin 81 engages one of the edges of slot 82 the coarse resistance 95 will be adjusted to give effect to the vernier. In this manner a semi-automatic standardizing operation is accomplished. All that it is necessary for the operator to do is to push button 93. Thereafter the instrument will standardize itself.

From the above description it will be seen that there is provided a simple and accurate means whereby a potentiometer circuit may be automatically standardized by the instrument itself as a result of a small manual movement. This operation is accomplished correctly within the sensitivity of the instrument itself and is not dependent upon the sensitivity of the operator's adjustment. With the construction of Figure 3, the only adjustment made by the operator is a coarse adjustment while with the construction of Figure 5 the instrument makes both the coarse and fine adjustments of the standardizing resistance. This operation may be performed at any time with a minimum amount of effort by the operator and a maximum of accuracy.

While in accordance with the provisions of the statutes, we have illustrated and described the best form of our invention now known to us, it will be apparent to those skilled in the art that changes may be made in the form of apparatus disclosed without departing from the spirit of our invention as set forth in the appended claims, and that in some cases certain features of our invention may sometimes be used to advantage without a corresponding use of other features.

Having now described our invention, what we claim as new and desire to secure by Letters Patent is:

1. In a potentiometer instrument having a potentiometer circuit including a standard source of current and a standardizing resistance, a switch operable to insert or to remove the source of current from the circuit, a clutch comprising rotatable driving and driven parts that are normally separated, said driven part serving to adjust the resistance, a member movable about a pivot, means to move said member to positions proportional to the unbalance of the potentiometer circuit, a rotatable element connected to said driving part of said clutch, a connecting link between said member and element whereby the latter is moved by the former, and manually operated means to simultaneously move said switch to a position to insert the standard source of current in said circuit and move said driving and driven parts of said clutch together whereby operation of said member will adjust the resistance.

2. In a potentiometer instrument, the combination of a variable resistance, a switch, a clutch comprising a pair of axially aligned discs, one of said discs serving to adjust said resistance, a shaft upon which the second of said discs is mounted, means to bias said shaft to a position in which said discs are separated, a rod extending parallel to said shaft, means operated by said rod to move said shaft to cause engagement between the clutch discs, means also operated by said rod to simultaneously actuate said switch, and mechanism operated by a working part of the potentiometer instrument to rotate said shaft.

3. In a potentiometer instrument, a variable resistance, a clutch comprising coaxially disposed, rotatable driving and driven parts, a connection between said driven part and said resistance, a shaft upon which said driving part is mounted, an arm extending from said shaft, means comprising a movable member of the instrument to swing said arm around said shaft as a center and thereby rotate said driving part, means to move normally said driving part out of engagement with said driven part, a tilting lever acting on the end of said shaft to move said shaft and driving part to bring the latter into driving engagement with said driven part, and a rod extending parallel to said shaft to operate said tilting lever.

4. In a potentiometer instrument, a member movable to various positions depending upon potentiometer unbalance, a link having rack teeth formed thereon movable through a path by said member, a pinion engaged by the rack teeth and rotated as said link is moved, a clutch comprising a driving disc and a driven disc, means connecting said driving disc and said pinion whereby the former is rotated by the latter, means to maintain normally said clutch discs out of engagement with each other, a variable resistance connected to be adjusted by said driven disc, and means to move said driving disc into engagement with said driven disc so that movement of said member may be utilized to adjust said resistance.

5. In a potentiometer instrument, a member movable in response to potentiometer unbalance, a link having rack teeth formed on one end and moved through a path by said member, a rotatable pinion engaged by said rack teeth, a shaft to which said pinion is attached, a clutch comprising driving and driven discs, the former being mounted on said shaft, a variable resistance including rotatable parts one of which includes said driven disc as a part thereof, the rotatable parts of said resistance being mounted on said shaft, means to maintain normally said clutch discs out of engagement with each other, means to move said driving clutch disc, its shaft and the pinion in a direction to bring said clutch discs into engagement with each other whereby said resistance will be adjusted by said member, said pinion being wide enough so that movement thereof will not disengage it from said rack teeth.

6. In a potentiometer instrument, the combination of a rotatable disc having a resistance element thereon, said disc having a flat face, a shaft upon which said disc is rotatably mounted, a clutch disc on one end of said shaft and adapted to be brought into engagement with said face of said rotatable disc, a pinion on the other end of said shaft, a member moving to various positions in response to potentiometer unbalance, a link attached at one end to said member and having rack teeth on its other end meshing with said pinion whereby motion of said member is continuously transferred to said pinion, shaft and clutch disc, a contact being in engagement with said resistance to prevent normal movement of said rotatable disc, and manually operated means acting on said clutch disc to move it axially into engagement with the face of said rotatable disc to rotate the latter by movement of the former, said pinion being wide enough to remain in mesh with said rack during the axial movement of said clutch disc.

JOHN A. CALDWELL.
GEORGE W. BARNES, Jr.

REFERENCES CITED

The following references are of record in the file of this patent:

UNITED STATES PATENTS

| Number | Name | Date |
| --- | --- | --- |
| 2,267,682 | Fairchild et al. | Dec. 23, 1941 |
| 1,931,223 | Harrison | Oct. 17, 1933 |
| 2,368,912 | Barnes | Feb. 6, 1945 |